United States Patent Office
3,833,643
Patented Sept. 3, 1974

3,833,643
PROCESS FOR THE PRODUCTION OF PURE ARYL ESTERS OF DICARBOXYLIC ACIDS
Hans Leo Hulsmann, Wetter (Ruhr), and Gustav Renckhoff, Witten (Ruhr), Germany, assignors to Dynamit Nobel Aktiengesellschaft, Troisdorf, Germany
No Drawing. Filed Feb. 28, 1972, Ser. No. 230,116
Claims priority, application Germany, Feb. 26, 1971, P 21 09 102.1
Int. Cl. C07c 69/80, 69/82
U.S. Cl. 260—475 PN                                14 Claims

ABSTRACT OF THE DISCLOSURE

A process for the production of aryl esters of polycarboxylic acids such as isophathalic and terephthalic acid is disclosed which is an improvement in the process disclosed in U.S. Patent 3,471,549. The improvement of the subject process involves the addition of a carbonic acid diaryl ester in place of the lower fatty acid anhydride used in the process of the patent. The carbonic acid diaryl ester is added in an amount which is at least equivalent to the alkyl ester groups still present in the reaction mixture which contains the desired aryl ester of the polycarboxylic acid.

---

This invention relates to the production of aryl esters of polycarboxylic acids, especially dicarboxylic acids, and more particularly to an improvement in the process for producing such esters disclosed in U.S. Pat. No. 3,471,549.

According to German Pat. 1,283,849 and corresponding U.S. Pat. No. 3,471,549, pure aryl esters of dicarboxylic acids are obtained by heating alkyl esters of alkanols of 1–6 carbon atoms and iso- or terephthalic acid with at least equivalent amounts of monohydric phenols and/or naphthols and/or phenols or naphthols substituted by alkyl and/or by aralkyl groups, in the presence of conventional interesterification or ester radical interchange catalysts, to temperatures of above 160° C., with the thus-liberated alkanol being removed as rapidly as possible; by adding, after splitting off about 50–75% of the stoichiometric amount of alkanol, an amount of a lower fatty acid anhydride which is at least equivalent to the alkyl ester groups still present in the reaction medium; and by terminating the reaction, while removing the thus-formed alkyl ester of the lower fatty acid as quickly as possible.

The reaction is conducted in the initial phase preferably at temperatures of 180–250° C., with the split-off alkanol being removed as completely as possible. Among the known interesterification catalysts, titanic acid esters such as butyl titanate are especially active. As soon as the reaction rate has decreased after splitting off about 50–75% of the stoichiometric amount of alkanol, an amount of a lower fatty acid anhydride, preferably acetic anhydride, is added. This amount is determined stoichiometrically and is at least sufficient for a quantitative conversion of a quantity of phenol into aryl ester which is equivalent to the still present alkyl ester groups. When the reaction temperature is still further increased, the lower fatty acid and the alkyl ester thereof are distilled off; whereas the fatty acid aryl ester flows back into the reaction mixture. After the lower carboxylic acid and the alkyl ester thereof have been completely removed, and any fatty acid aryl ester has been distilled off, a uniform dicarboxylic acid diaryl ester product is present. This ester product, however, still contains catalyst. The crude ester is purified by distillation or crystallization.

It has now been discovered that the process according to U.S. Pat. 3,471,549, can be conducted even more simply and economically by adding, after about 50–75% of the stoichiometric amount of alkanol has been split off, in place of the lower fatty acid anhydride, a quantity of carbonic acid diaryl ester at least equivalent to the alkyl ester groups still present in the reaction mixture, and terminating the reaction with as quick a removal of the thus-formed carbonic acid dialkyl ester as possible.

The replacement of lower fatty acid anhydrides by carbonic acid diaryl esters provides two advantages as compared to the mode of operation according to the state of the art: Firstly, the percent proportion of aryl residues in the carbonic acid diaryl esters is larger than in the corresponding esters of a lower fatty acid, due to the difference in the formula weights of the dibasic carbonic acid and the monobasic fatty acid. This results in an improved space-time yield, since lesser amounts by weight of additive are required in the final phase for completing the reaction within short periods of time. Secondly, when using carbonic acid diaryl esters, the only neutral byproduct formed in the reaction is carbonic acid alkyl ester; whereas in case of an addition of a lower fatty acid anhydride, the corresponding fatty acid and the alkyl ester thereof are obtained.

It will be appreciated that suitable carbonic acid diaryl esters include phenyl, cresyl, xylenyl, naphthyl and the like ester derivatives of carbonic acid. Preferably only symmetrical carbonic acid aryl esters (i.e. those with the same aryl groups or residues) are employed. The esters may be represented by the following formula:

where R and R' are aryl groups which are equal to each other. Also, it will be understood that the carbonic acid diaryl ester to be employed according to the invention is derived in each case from the respectively used phenol. Thus in the preparation of the dicresyl esters of the polycarboxylic acids, dicresyl carbonate is used.

The carbonic acid diaryl ester is generally employed in an amount equivalent to the alkyl ester groups still present in the reaction mixture. If an excess is used it is only a minor amount.

With respect to the dicarboxylic acid dialkyl esters to be employed, the phenolic reaction component used, and the process conditions and catalysts, those disclosed in the U.S. Pat. No. 3,471,549 apply in full scope. Thus it will be understood that the disclosure of this patent is incorporated herein by reference. The most effective catalysts are titanic acid esters, e.g. butyl titanate, or phenyl titanate into which the butyl ester is converted during the reaction. Prior to adding the carbonic acid diaryl ester, any unreacted phenol still present in the reaction mixture can be removed therefrom by distillation.

In the following example 1, the preparation of "DPI 50" is set forth. "DPI 50" is a mixture of equimolar amounts of diphenyl iso- and terephthalate. It will be appreciated that this mixture is required, inter alia, for the production of certain polyesters.

The process of this invention will be further understood by reference to the following examples:

Example 1

A mixture of 97 parts by weight of dimethyl isophthalate (0.5 mole), 97 parts by weight of dimethyl terephthalate (0.5 mole), and 164.5 parts by weight of phenol (1.75 moles) is heated, with the addition of 1.94 parts by weight of butyl titanate (1% by weight, based on the dimethyl esters employed) as the catalyst, under agitation in a flask equipped with a fractionating column, a thermometer, and a metering device, while passing a slow stream of nitrogen through the apparatus. During the course of 6 hours of reaction, 60% of the stoichiometric amount of methanol is distilled off. During this period, the temperature in the flask rises to 276° C.

Thereafter, upon cooling the reaction mixture to 260° C., 85.5 parts by weight of carbonic acid diphenyl ester is added thereto. While the reaction temperature is increased to 290° C., 14 parts by volume of distillate is distilled off during 4 hours. This distillate consists essentially of carbonic acid dimethyl ester. The residual crude product is subjected to fractional distillation under a vacuum. Under a vacuum of 10 torr (mm. Hg.), 297 parts by weight of "DPI 50," i.e. a mixture of equimolar amounts of diphenyl iso- and terephthalate pass over between 277° and 280° C. This represents 93.5% of the theoretical yield. The diphenyl ester mixture obtained is clearly molten at 180° C. The melt is colorless and water-clear. The saponification number is 353 (calculated: 353).

Example 2

194 parts by weight of dimethyl terephthalate (1 mole) is reacted with 216 parts by weight of freshly distilled p-cresol (2 moles) and 2 parts by weight of tetrabutyl titanate (about 1% by weight, based on the dimethyl ester utilized), in the apparatus used in Example 1, the procedure being as described in the previous example. After 8 hours, 45 parts by weight of methanol (=70% of the stoichiometric amount) is distilled off. During the reaction, the temperature in the interior of the flask rises from 200 to 235° C. After the addition of 80 parts by weight of di-p-cresyl carbonate, the mixture is further heated, thus obtaining, within 4 hours, 27 parts by weight of distillate consisting essentially of carbonic acid dimethyl ester. The crude product is fractionally distilled under vacuum. As the main run, at 250° C. under 1 torr (mm. Hg.), 312 parts by weight of di-p-cresyl terephthalate is obtained, i.e. 90% of theory. The ester melts at 200° C. The saponification number is 326 (calculated value: 324).

While the novel principles of the invention have been described, it will be understood that various omissions, modifications and changes in these principles may be made by one skilled in the art without departing from the spirit and scope of the invention.

What is claimed is:

1. A process for the production of aryl esters of polycarboxylic acids, which comprises reacting an alkyl ester of a polycarboxylic acid selected from the group consisting of benzene dicarboxylic acids having carboxyl groups positioned other than ortho to each other and alkyl ester groups containing 1 to 6 carbon atoms with a phenolic compound selected from the group consisting of phenol, naphthol and alkyl- and aryl alkyl-substituted phenols and naphthols, said phenolic compound being used in a molar amount of at least equivalent to the number of alkyl ester groups maintained in the alkyl ester, in the presence of an interesterification catalyst at temperatures above 160° C., while distilling the alkanol formed in the resulting reaction as rapidly as possible; lowering the temperature of the reaction mixture after about 50–75% of the alkanol amount calculated for complete esterification reaction has been removed; adding a carbonic acid diaryl ester to the reaction mixture in an amount which is at least equivalent to the alkyl ester groups still present in the reaction mixture, said diaryl ester containing aryl groups corresponding to those in the phenolic compound used as a reactant; and increasing the reaction temperature so that the resulting carbonic acid dialkyl ester will distill off from the reaction mixture and the aryl groups of the carbonic acid react with the remaining alkyl ester of the polycarboxylic acid to form the desired product.

2. The process of claim 1, wherein prior to the addition of the carbonic acid diaryl ester, any unreacted phenol still present in the reaction mixture is removed therefrom by distillation.

3. The process of claim 1, wherein the residual crude product obtained after increasing the reaction temperature and distilling off the carbonic acid dialkyl ester is subjected to fractional distillation under vacuum to recover the desired product.

4. The process of claim 1, wherein the polycarboxylic acid is isophthalic acid.

5. The process of claim 1, wherein the polycarboxylic acid is terephthalic acid.

6. The process of claim 1, wherein the alkyl ester of a polycarboxylic acid is a methyl ester of said carboxylic acid.

7. The process of claim 1, wherein the catalyst is selected from the group consisting of antimony oxide, carboxylic acid esters of tin, alkyl esters of titanic acid, metallic magnesium, metallic aluminum and mixtures thereof.

8. The process of claim 7, wherein 0.1 to 5.0% by weight, based on the amount of alkyl ester of said polycarboxylic acid, of the catalyst is employed.

9. The process of claim 8, wherein the alkyl ester is a methyl ester of the polycarboxylic acid.

10. The process of claim 8, wherein the titanium alkyl ester is butyl titanate.

11. The process of claim 1, wherein the carbonic acid diaryl ester is the diphenyl ester of carbonic acid.

12. A process for the production of pure aryl esters of a polycarboxylic acid selected from the group consisting of isophthalic acid and terephthalic acid, from the methyl ester of this acid which comprises reacting said methyl ester with at least equivalent amounts of monohydric phenol compounds selected from the group consisting of phenol, naphthol, and phenols or naphthols substituted by alkyl and/or by aralkyl groups, in the presence of an interesterification catalyst selected from the group consisting of antimony oxide, carboxylic acid esters of tin, alkyl esters of titanic acid, metallic magnesium, metallic aluminum and mixtures thereof at temperatures of above 160° C., with the liberated methanol being removed as quickly as possible by distillation; adding, after splitting off about 50–75% of the stoichiometric amount of methanol, and lowering the temperature of the reaction mixture, a quantity of a carbonic acid diaryl ester at least equivalent to the methyl ester groups still present in the reaction medium, said diaryl ester containing aryl groups corresponding to those in the phenolic compound used as reactant; and terminating the reaction while removing the formed carbonic acid dialkyl ester as quickly as possible from the desired product.

13. The process of claim 12, wherein the carbonic acid diaryl ester is the diphenyl ester.

14. The process of claim 12, wherein the carbonic acid diaryl ester is the dicresyl ester.

References Cited

UNITED STATES PATENTS 3,413,336   11/1968   Hulsmann et al. __ 260—475 PN

LORRAINE A. WEINBERGER, Primary Examiner

E. J. SKELLY, Assistant Examiner